(12) United States Patent
Li et al.

(10) Patent No.: US 10,498,224 B2
(45) Date of Patent: Dec. 3, 2019

(54) PFWM CONTROL METHOD FOR POWER SUPPLY

(71) Applicant: SHANGHAI TUITUO TECHNOLOGY CO., LTD, Shanghai (CN)

(72) Inventors: Renhong Li, Shanghai (CN); Zhuo Shen, Shanghai (CN)

(73) Assignee: SHANGHAI TUITUO TECHNOLOGY CO., LTD, Shanghai (CN)

( * ) Notice: Subject to any disclaimer, the term of this patent is extended or adjusted under 35 U.S.C. 154(b) by 0 days.

(21) Appl. No.: 16/393,426

(22) Filed: Apr. 24, 2019

(65) Prior Publication Data
US 2019/0326812 A1    Oct. 24, 2019

(30) Foreign Application Priority Data
Apr. 24, 2018   (CN) .......................... 2018 1 0370657

(51) Int. Cl.
*H02M 1/42*    (2007.01)
*H02M 3/335*   (2006.01)
*H02M 1/00*    (2006.01)

(52) U.S. Cl.
CPC ....... *H02M 1/4233* (2013.01); *H02M 1/4258* (2013.01); *H02M 3/33569* (2013.01); *H02M 2001/0009* (2013.01); *H02M 2001/0058* (2013.01); *H02M 2001/4291* (2013.01)

(58) Field of Classification Search
CPC .. H02M 1/42; H02M 1/44; H02M 2001/0009; H02M 1/4208; H02M 1/425; H02M 1/4258; H02M 3/335; H02M 1/4241; H02M 3/33569; H02M 2001/0058; H02M 1/4233

See application file for complete search history.

(56) References Cited

U.S. PATENT DOCUMENTS 9,374,001  B1 *  6/2016  Subramaniam .........  H02M 3/04
2010/0002480 A1 *  1/2010  Huynh .................. H02M 3/335
                                                                    363/90

(Continued)

*Primary Examiner* — Fred E Finch, III
*Assistant Examiner* — Rafael O. De León Domenech
(74) *Attorney, Agent, or Firm* — Muncy, Geissler, Olds & Lowe, P.C.

(57) ABSTRACT

A PFWM control method for a combination power supply of boost converter and bridge type DC-DC converter is disclosed. The bridge type DC-DC converter may include half bridge, full bridge or BUCK. The method includes simultaneously controlling the boost and DC-DC converters by using PFWM. In one aspect, the bridge type DC-DC output voltage or current or power is sensed to obtain duty of PWM for driving switching components. The duty is used to adjust DC-DC output voltage or current or power. In the other aspect, the boost converter's operating parameter is sensed to obtain a frequency of PFM for driving switching components. The frequency is used to adjust boost output voltage. The above frequency and duty are combined into at least a pair of complementary PFWM driving signals, to directly or indirectly drive switching components of the combination power supply of boost converter and bridge type DC-DC converter.

10 Claims, 8 Drawing Sheets

(56) References Cited

U.S. PATENT DOCUMENTS

| | | | |
|---|---|---|---|
| 2012/0262954 A1* | 10/2012 | Duvnjak | H02M 1/4258 363/21.02 |
| 2013/0003430 A1* | 1/2013 | Reddy | H02M 3/337 363/74 |
| 2015/0022163 A1* | 1/2015 | Han | H02M 1/4208 323/205 |
| 2017/0025962 A1* | 1/2017 | Davidson | H02M 1/42 |

* cited by examiner

PFWM CONTROL METHOD FOR POWER SUPPLY

CROSS-REFERENCE TO RELATED APPLICATION

This application claims the priority of Chinese patent application number 201810370657.5, filed on Apr. 24, 2018, the entire contents of which are incorporated herein by reference.

TECHNICAL FIELD

The present invention relates to a Pulse Frequency Width Modulation (PFWM) control method used to control a power supply comprising both a boost converter and a bridge type DC-DC converter such as half bridge, full bridge or BUCK, etc.

BACKGROUND

Electrical equipment or appliance connected to AC power grid line should satisfy current harmonic standard IEC61000-3-2. With regard to different equipment or applications, IEC61000-3-2 has correspondingly set different current harmonic limits, among which, a Class A limit is for normal electrical equipment, Class B for portable tools and non-professional welding equipment, Class C for lighting equipment, and class D for portable personal computer, monitor and TV.

Existing switching mode power supply technology for realizing power factor correction function mainly utilizes active power factor correction (PFC) method implemented by boost converter (see FIG. 1 and FIG. 2).

Such boost converter when integrated with DC-DC converter, can achieve excellent power factor correction performance. However, due to independent circuits of the boost and DC-DC converters, each circuit includes its individual power switching component, and feedback control and driving unit, so that the cost is high, size becomes big and efficiency exhibits low.

In order to overcome the above shortcomings, a combination circuit of boost and bridge type converters is presented in FIG. 3. This circuit, by taking use of the switching component of the bridge type converter, to also drive the boost inductor, eliminates the use of a boost switching component, a boost rectifier and an individual pulse width modulation (PWM) PFC control unit in a conventional boost PFC circuit, as the result, cost is reduced, space saved and efficiency improved.

However, the above combination power supply (FIG. 3) shares a common switching component, making it impossible to simultaneously control the boost converter and the DC-DC converter by using a conventional feedback control and driving unit. If a conventional feedback control and driving unit is used to control such a combination power supply, there could be a number of disadvantages:

Disadvantage 1: Boost output voltage not under control.

Disadvantage 2: When boost inductor operates at a high AC input voltage, due to the low reset voltage Vdc−Vin (Vdc: boost output voltage on C2), an unlimited duty decided by the DC-DC converter would cause insufficient magnetic reset of the boost inductor, and Vdc has to be designed high enough to ensure the reset.

Disadvantage 3: When boost inductor operates at a continuous current mode, first switching component Q2 works in hard switching mode, and loss becomes high.

Disadvantage 4: When boost inductor operates at a discontinuous current mode, boost inductor L1, boost capacitor C1, second switching component Q3, storage capacitor C2 construct a resonant circuit which may cause uncontrolled current loop loss.

Causes of the disadvantages are explained as follows:

According to FIG. 3 and FIG. 4, the combination power supply of boost and asymmetrical half bridge converters operates as follows: The bridge type DC-DC converter is controlled by PWM. Sense and feedback the DC-DC converter's output parameter like voltage or current or power, compare the output parameter to a setting value and according to automatic control theory (Examples: PID, Zero pole method), obtain the duty of PWM. Form a PWM chopping signal under a preset frequency which is usually set by a control IC, and use the PWM chopping signal to drive first switching component Q2 and second switching component Q3. The DC-DC converter's output can be stabilized by adjustment of the obtained duty.

When first switching component Q2 conducts, second switching component Q3 cuts off, storage capacitor C2, first switching component Q2, resonant capacitor Cr, resonant inductor Lr and main transformer T1 construct a primary side power loop of serial resonant half bridges, and energy transfers to secondary side through T1. At same time, Boost capacitor C1, first switching component Q2 and boost inductor L1 construct a boost loop, and boost energy is stored in L1.

When first switching component Q2 cuts off, second switching component Q3 conducts, storage capacitor C2, second switching component Q3, resonant capacitor Cr, resonant inductor Lr and main transformer T1 construct a primary side power loop of serial resonant half bridges, and energy continuously transfers to secondary side through T1. Induced voltage on boost inductor L1 and voltage on boost capacitor C1 accumulate to charge storage capacitor C2, accomplishing boost conversion.

Controlling and operating above combination power supply may lead to the following disadvantages:

For disadvantage 1: Boost output is not under control. By using feedback and driving controller 300, first switching component Q2 and second switching component Q3 are driven by PWM complement signal, so that DC-DC output can be stabilized by duty of PWM signal as in conventional method. However, due to the use of the same PWM signal to drive boost circuit via Q2, boost circuit output has no feedback control and it swings according to DC-DC's PWM and input AC instant voltage. Bridge type DC-DC converter's maximum duty is always smaller than 50%, and therefore, boost converter's duty is also limited to less than 50%. Instead of a nearly 100% operation in conventional boost converters, 50% duty at input AC low instant voltage makes the boost converter insufficient to convert power, so that the boost output voltage on C2 would be possibly lower than input AC peak voltage. Charging current through D1 might occur at peak AC instant voltage as shown in FIG. 5a and FIG. 5b which makes AC input current distorted at low input voltage and heavy load.

For disadvantage 2: When boost inductor operates at high AC input voltage, due to low reset voltage Vdc−Vin (Vdc: boost output voltage on C2; Vin: instant AC input voltage), unlimited duty decided by the DC-DC converter would cause insufficient magnetic reset of the boost inductor.

Magnetic reset equation of boost inductor is expressed as $Vin*Duty=(Vdc-Vin)*(1-Duty)$, so $Duty(max)=(Vdc-Vin)/Vdc$ can be derived. When Vin is at its sinusoidal peak, due to instant Vin close to Vdc, Duty(max) has to be very small to ensure voltage-second balance to realize magnetic reset. Once DC-DC converter's duty exceeds Duty(max), boost inductor L1 will be saturated and first switching component damaged.

For disadvantage 3: When boost inductor operates at continuous current mode, first switching component Q2 works in hard switching mode as that in conventional boost converters. During cut-off interval of Q2, there is no resonant current reversely discharging the parasitic capacitor of Q2, so zero voltage switch (ZVS) would not occur at Q2's subsequent turning on.

For disadvantage 4: When boost inductor operates at discontinuous current mode, boost inductor L1, boost capacitor C1, second switching component Q3, storage capacitor C2 construct a resonant circuit. After boost current falls to zero ampere, and at the state of Q2 turn off and Q3 turn on, voltage on storage C2 will charge resonant tank constituted by L1 and C1 through Q3. The resonant current causes current loop loss if it was not under control.

For purpose of solving the above problems, a kind of PFWM method is disclosed to replace the conventional PWM or PFM control method.

SUMMARY OF THE INVENTION

The invention provides a PFWM control method which contains both frequency modulation and pulse width modulation suitable for the above combination power supply incorporating boost and bridge type DC-DC converters. The PFWM control method retains the PWM control for bridge type DC-DC converter in a conventional method, and further controls boost converter by adjusting frequency so that the boost converter operation is no longer constrained by DC-DC PWM control as in conventional method.

On the other hand, the PFWM control method confines PWM duty with calculated maximum duty according to different instant input voltages, to ensure magnetic reset of boost inductor, and avoid saturation of boost inductor. Furthermore, in a discontinuous current mode (DCM) of boost inductor, a resonance generated by boost inductor and boost capacitor is utilized to realize ZVS for switching components, thus improving power supply efficiency.

The PFWM control method of the present invention is suitable for use with a power supply comprising a boost converter and a bridge type DC-DC converter, the bridge type DC-DC converter having a topology selected from the group consisting of BUCK, half bridge and full bridge, wherein the PFWM control method comprises simultaneously controlling the boost converter and the bridge type DC-DC converter;

wherein controlling of the bridge type DC-DC converter at least comprises controlling PWM of the bridge type DC-DC converter by sensing and feedbacking at least one output parameter among voltage, current and power of the bridge type DC-DC converter, comparing the output parameter to a first setting value, obtaining a duty of PWM chopping signal based on an automatic feedback control theory, and controlling output of the bridge type DC-DC converter at least by adjustment of the obtained duty;

wherein controlling of the boost converter at least comprises controlling PFM of the boost converter by sensing and feedbacking at least one boost converter parameter among input voltage, output voltage, current, power and phase, comparing the boost converter parameter to a second setting value or range, obtaining a frequency of PFM chopping signal based on a feedback control theory, and controlling output of the boost converter by continuous or discontinuous adjustment of the obtained frequency;

wherein the PFWM control method further comprises combining the obtained frequency of PFM chopping signal and duty of PWM chopping signal to form at least a pair of complementary PFWM driving signals, and driving switching components of the bridge type DC-DC converter and the boost converter by the PFWM driving signals with or without modification, so as to adjust output of the boost converter and output of the bridge type DC-DC converter.

Optionally, the PFWM control method further comprises monitoring an input instant voltage of the boost converter, and obtaining by a logic or mathematic calculation unit, a maximum duty to prevent saturation of a boost inductor in the boost converter caused by insufficient magnetic reset, the maximum duty limiting an operating duty of the PFWM driving signal.

Optionally, the PFWM control method further comprises dead time control between the complementary PFWM driving signals, to drive the switching components of the boost converter and the bridge type DC-DC converter.

Optionally, the PFWM control method further comprises sensing an instant input voltage or sensing an instant voltage after rectification, and setting a frequency of the PFWM driving signal based on the sensed value or range.

Optionally, the PFWM control method further comprises sensing an output voltage of the boost converter, and obtaining a maximum duty to prevent saturation of a boost inductor of the boost converter caused by insufficient magnetic reset, the maximum duty limiting an operating duty of the PFWM driving signal.

Optionally, the PFWM control method further comprises sensing an instant input voltage phase and setting a frequency of the PFWM driving signal according to the sensed phase.

Optionally, the PFWM control method further comprises sensing an instant input voltage or sensing an instant voltage after rectification, and dynamically setting an output voltage of the boost converter according to the sensed value or range.

Optionally, the PFWM control method further comprises detecting zero current of a boost inductor in the boost converter, and controlling a time interval between occurrence of the zero current of the boost inductor and a subsequent cut-off of the switching component of the bridge type DC-DC converter.

Optionally, the PFWM control method further comprises sensing an instant input voltage or sensing an instant voltage after rectification, and setting a maximum frequency of the PFWM driving signal according to the sensed value or range.

Optionally, the PFWM control method further comprises sensing an instant input voltage or sensing an instant voltage after rectification, and setting a minimum frequency of the PFWM driving signal according to the sensed value or range.

The present invention has the following advantages over the prior art:

The present invention provides a combination power supply of boost converter and bridge type DC-DC converter. By using a PFWM driving signal with frequency modulation and pulse width modulation, the present invention is able to control both boost conversion and DC-DC conversion. PWM duty is controlled based on a maximum duty to prevent saturation of boost inductor in the boost converter.

Further, the control of the maximum operating frequency and the minimum operating frequency, and the dead zone control of the switching elements, can realize the soft switching of the resonant zero-voltage conduction of the combination circuit of Boost and bridge or BUCK converters.

Furthermore, comparing to conventional independent boost and DC-DC feedback control units, using PFWM control method to control combination power supply of boost and bridge type converters could enjoy low cost and smaller size advantages.

DETAILED DESCRIPTION OF EXEMPLARY EMBODIMENTS

Figure 1:
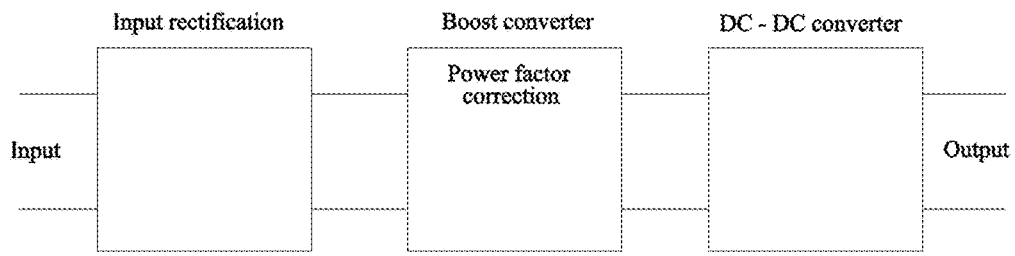
FIG. 1 is a diagram of a conventional combination power supply comprising boost and bridge type DC-DC converters.
Figure 2:
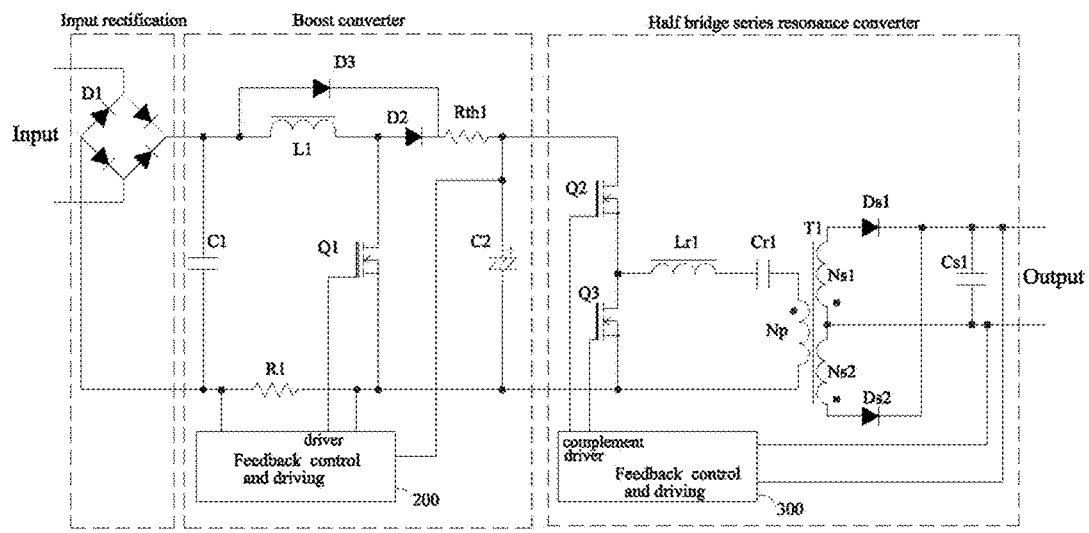
FIG. 2 is a schematic of conventional boost and bridge type DC-DC converters.
Figure 3:
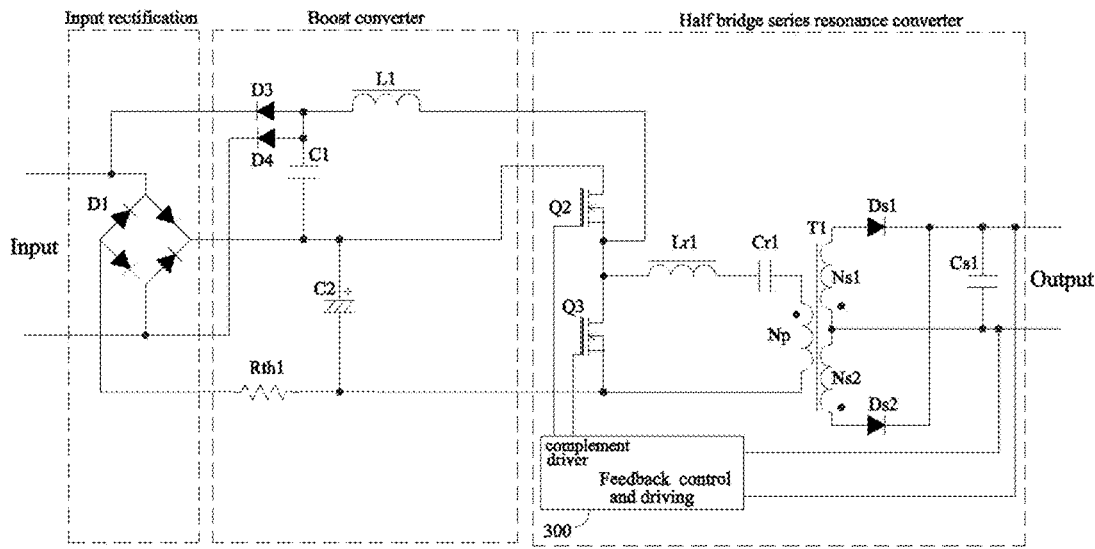
FIG. 3 is a structural schematic of a conventional combination power supply including boost and bridge type DC-DC converters.
Figure 4:
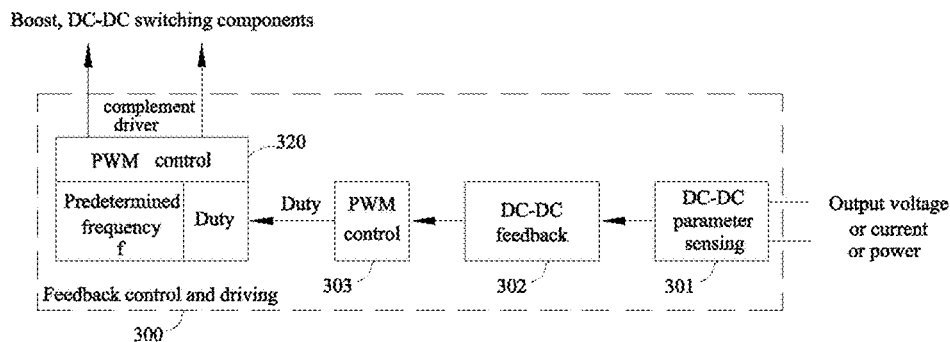
FIG. 4 is a diagram of a conventional PWM feedback control and driving unit
Figure 6:
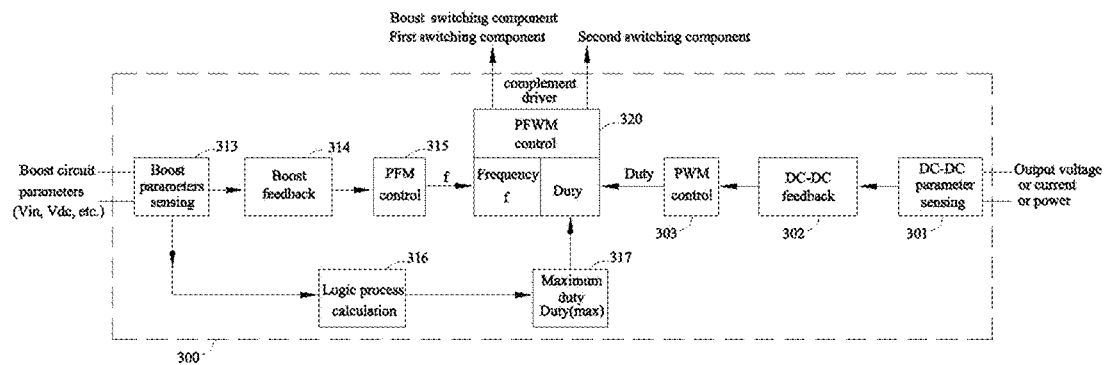
FIG. 6 is a diagram of a PFWM feedback control and driving unit according to the present invention.

Referring to attached drawings, one of the preferred embodiments in details is described herein as below:

Example of a combination power supply comprising boost and half bridge DC-DC converters is shown in FIG. 3, and a PWFM type feedback control and driving unit 300 that is suitable to be used with FIG. 3's circuit is shown in FIG. 6. The power supply system operating process comprises the following processes:

Process S1: PFWM controls both DC-DC converter and Boost converter.

Process S1.1: Sense and feedback DC-DC converter output parameter, compare it to setting value and obtain the duty of PWM chopping signal according to automatic control theory. The DC-DC output parameter may include but not constraint to output voltage or current or power. The automatic control theory could be conventional PID or zero-pole method, or any other suitable methods.

DC-DC converter's output voltage Vout can be expressed as a function of its operating duty: Vout=f(Duty). Details are provided below:

For an asymmetrical half bridge DC-DC converter, the power conversion equation is:

$$Vout = Vdc \cdot Duty \cdot (1-Duty) \cdot (Ns1/Np + Ns2/Np)$$

In the above equation, Vdc represents voltage on storage capacitor C2; Ns/Np represents primary to secondary turns ratio of main transformer. According to this equation, DC-DC converter's output could be adjusted by Duty.

Process S1.2: Sense and feedback boost converter parameter such as input voltage or output voltage or current or power or phase, compare it to setting value or range and obtain the frequency of PFM chopping signal according to feedback automatic control theory. Continuously or discontinuously adjust frequency to control the output power of the boost converter. Boost output power Pout can be expressed as a function of its operating frequency and duty: Pout=f(f, duty):

$$Pout = Vin \times Vdc \times Duty \times (1-Duty)/(2 \times f \times L)$$

In the above equation, Pout is boost circuit average output power; Vin is instant AC voltage after rectification; L is inductance of boost inductor like L1.

According to this equation, boost converter could be adjusted by frequency while Duty has been determined by DC-DC converter.

Figure 5A:
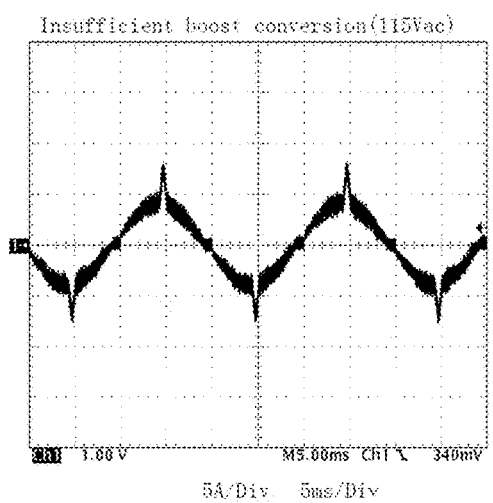
FIG. 5a and FIG. 5b show input current waveforms generated by conventional PWM feedback control and driving unit.
Figure 5B:
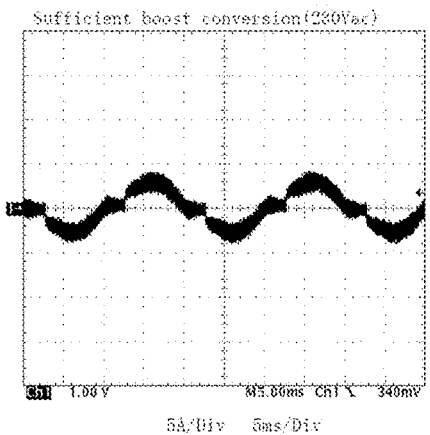
Figure 7:
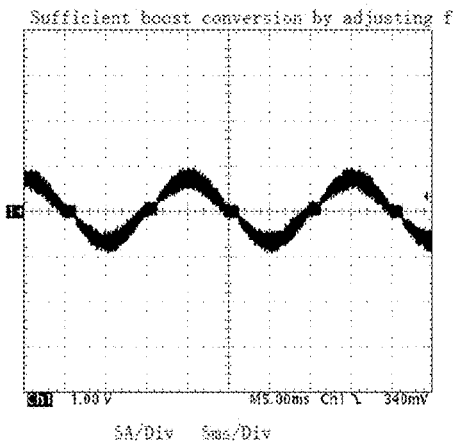
FIG. 7 shows an input current waveform generated by the PFWM control method of the present invention.

Based on DC-DC converter's feedback control, Duty is obtained; based on boost converter's feedback control, frequency is also obtained. Combine Duty and frequency into PFWM signal could control both boost converter and DC-DC converter. The input current waveform of FIG. 5a could be improved to the waveform as shown in FIG. 7 by adjusting frequency from PWM.

Process S2: To ensure magnetic reset of boost inductor L1 during input voltage alternating change. Magnetic reset equation of boost inductor is Vin*Duty=(Vdc−Vin)*(1−Duty), so Duty(Max)=(Vdc−Vin)/Vdc can be derived. The feedback control unit monitors input instant voltage and limits operating duty with Duty(max). When Vin is less than Vdc/2, the boost inductor can always reset because Q2 operates below 50% duty in the half bridge converter.

As voltage Vdc on storage capacitor C2 equals the boost output setting voltage in design, it is unnecessary to monitor Vdc when calculating Duty(max) if tolerance of resetting is allowed. In order to obtain a precise Duty(max), monitoring both Vdc and Vin is necessary.

When boost converter operates at continuous current mode (CCM), like in a conventional boost converter, first switching component Q2 operates at hard switch mode. In this embodiment, to reduce switching loss and EMI emission, Q2 could be designed in soft switching mode:

Process 2.1.1: Maximum frequency limitation fmax is designed to provide enough time for boost current to return to zero ampere, preventing L1 from entering into continuous current mode (CCM);

Process S2.2.2: From FIG. 8 to FIG. 12, operating principle of soft zero voltage switching (ZVS) is illustrated if boost inductor was designed in DCM.

Figure 8:
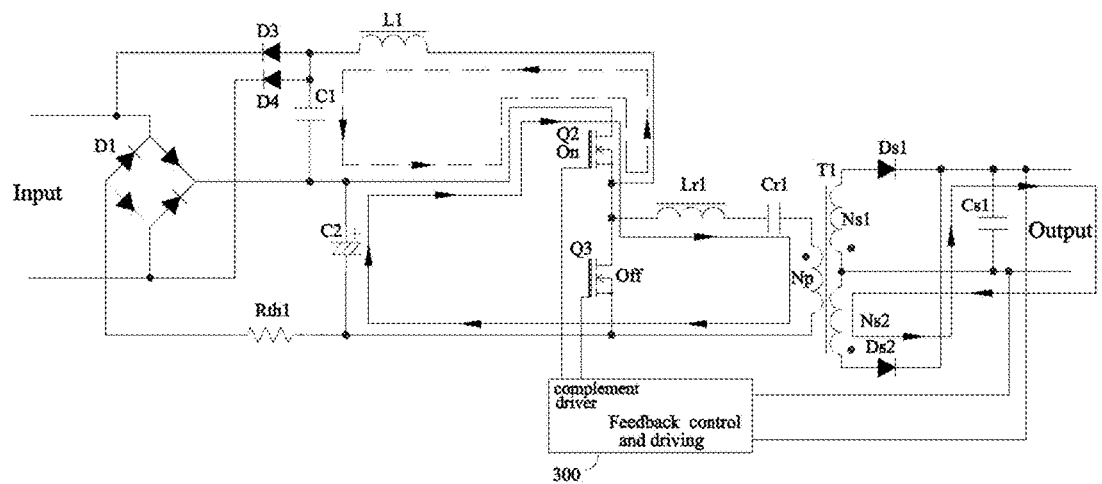
FIG. 8 shows operating state 1 of the combination power supply of boost and half bridge according to the present invention.

State 1: as shown in FIG. 8, switching component Q2 turns on, Q3 turns off.

Voltage on C1 reflects instant input AC voltage after rectification. Voltage on storage capacitor C2 is output of boost converter Vdc.

When Q2 conducts, energy in storage capacitor C2 flows in primary winding (Np) of T1, transfers to secondary winding Ns2, delivers power energy to load through output rectification component Ds2 and filter Cs1.

Figure 9:
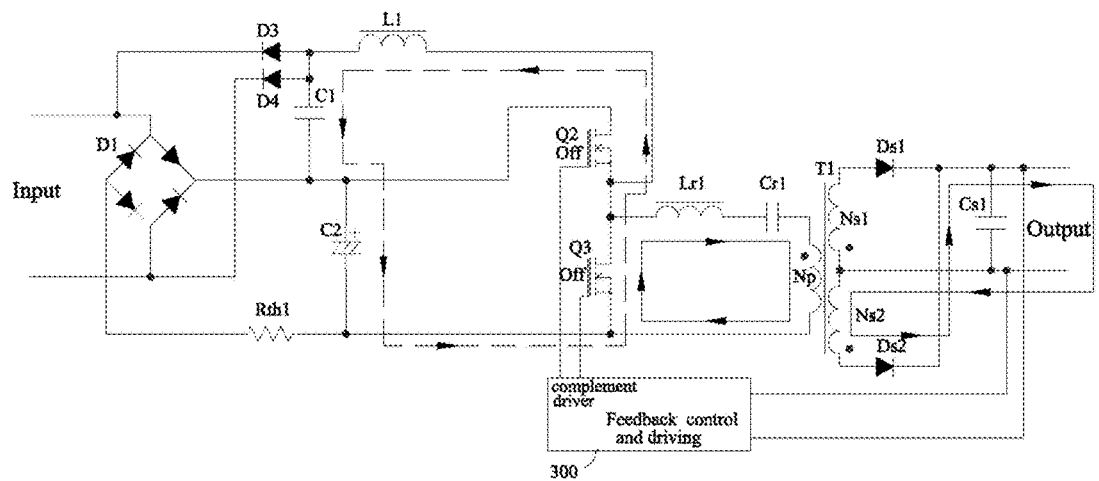
FIG. 9 shows operating state 2 of the combination power supply of boost and half bridge according to the present invention.

Simultaneously, energy on C1, through switching component Q2, flows into first boost inductor L1 as indicated by dotted line with arrow, boost energy stored in L1;

State 2: as shown in FIG. 9, switching component Q2 turns off, Q3 keeps turn-off. After Q2 turns off, resonant tank constructed by Lr1, Cr1 continues to drive T1; Cr1 is continued to be charged; energy continues to deliver to output load.

Simultaneously, energy stored in boost inductor L1, right after Q2's turn-off, generates induced voltage, which accumulates with voltage on boost capacitor C1 to charge storage capacitor C2 through second switching component Q3, thus accomplishing boost conversion. Parasitic capacitor of Q3 is reversely discharged to form zero voltage for ZVS at next state 3-1.

Figure 10:
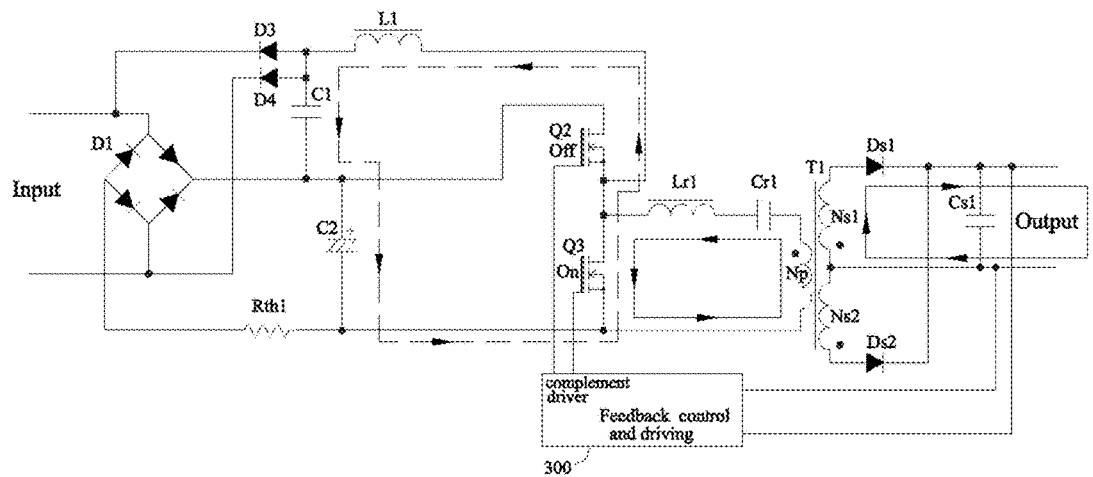
FIG. 10 shows operating state 3-1 of the combination power supply of boost and half bridge according to the present invention.

State 3-1: as shown in FIG. 10, switching component Q2 keeps turn-off, Q3 turns on. Boost inductor L1 continues releasing energy. The induced voltage of L1 and voltage on boost capacitor C1 superimpose to charge storage capacitor C2 till L1's stored energy is fully discharged. When energy in L1 is fully discharged, it operates as discontinuous current mode (DCM).

When Q3 conducts and resonant current in Lr1, Cr1 reverses, energy on Cr1 passes through Q3 and Lr1, and flows into primary winding Np of transformer T1. This half bridge converter, through isolated main transformer T1, converts energy from primary side to secondary side. The energy is further rectified by Ds1, filtered by Cr1, and delivered to output load.

Figure 11:
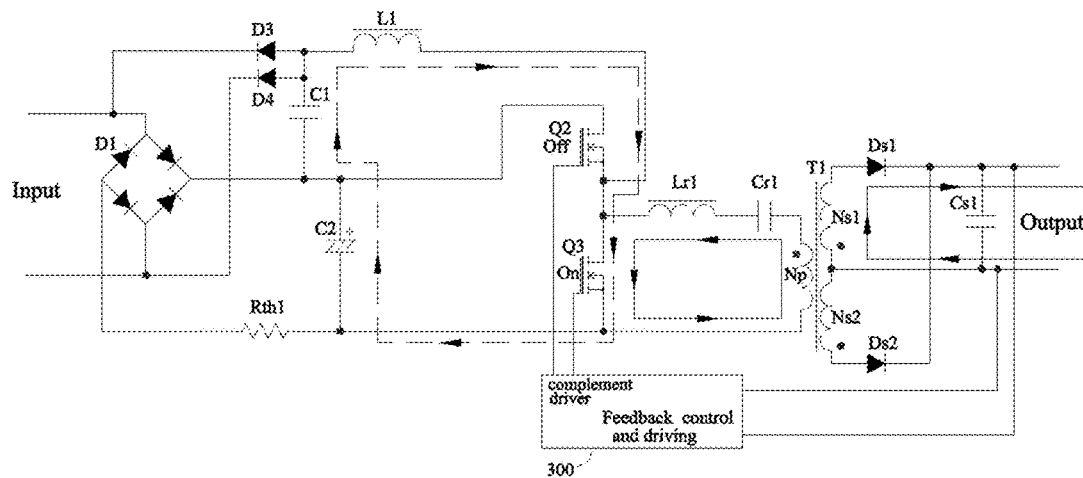
FIG. 11 shows operating state 3-2 of the combination power supply of boost and half bridge according to the present invention.

State 3-2: as shown in FIG. 11, switching component Q2 keeps turn-off, Q3 keeps turn-on. After energy in L1 is completely discharged, energy in storage capacitor C2, through second switching component Q3, starts to charge C1 and L1. Boost capacitor C1 and boost inductor L1 construct series resonant tank.

Lr and Cr1's resonant current continues delivering energy to secondary side load through transformer T1.

Figure 12:
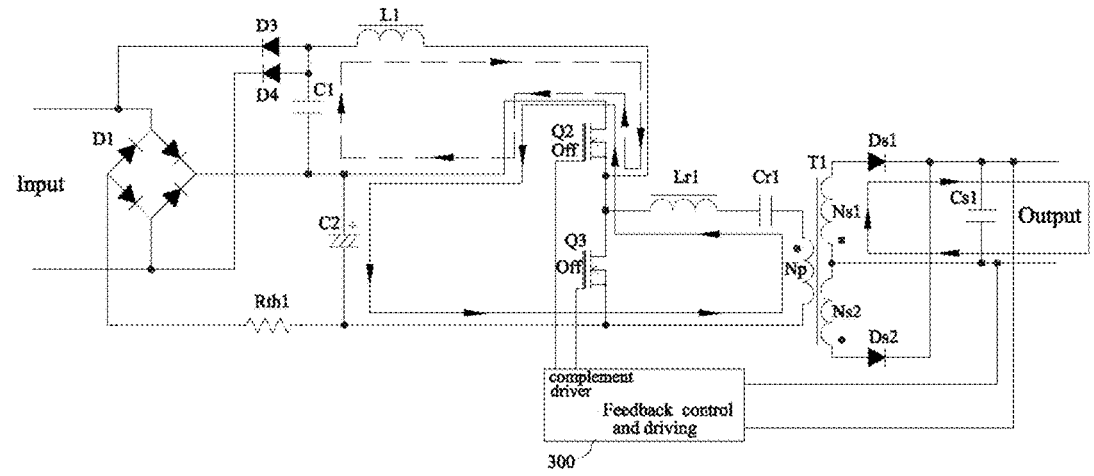
FIG. 12 shows operating state 4 of the combination power supply of boost and half bridge according to the present invention.

State 4: as shown in FIG. 12, switching component Q2 keeps turn-off, Q3 turns off.

When Q3 turns off, resonant current in boost inductor L1, through body diode of Q2, discharges Q2's parasitic capacitor, to form zero voltage for ZVS at next state 1. By controlling elapse time between boost inductor current down to zero and Q3's turn-off, ZVS performance can be optimized.

DC-DC resonant bridge operation principle is same as conventional asymmetrical half bridge. Its first switching component Q2 and second switching component Q3, operating at ZVS state, can improve efficiency. Furthermore, as the ZVS of switching components are achieved by boost converter not relying on asymmetrical bridge converter, the ZVS can achieve better performance than conventional asymmetrical half bridge converter at light load condition.

Figure 13:
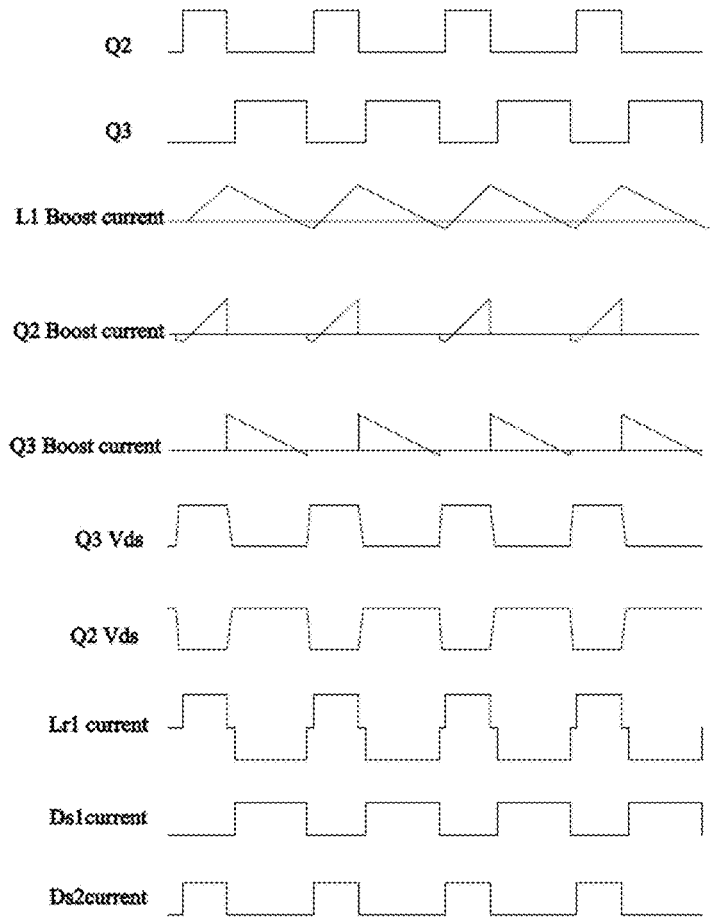
FIG. 13 shows operating waveform of the combination power supply of boost and half bridge according to the present invention.

Operating waveform from state 1 to state 4 is shown in FIG. 13. When input voltage is higher than Vdc/2, set maximum frequency $f_{(max)}$ dynamically to ensure enough time allowing current in boost inductor L1 to return to zero ampere. L1 operates at DCM.

When input voltage is lower than Vdc/2, set maximum frequency $f_{(max)}$ to enter DCM, also set resonant frequency of boost inductor L1 and boost capacitor to be lower than operating frequency f, and further set minimum operating frequency $f_{(min)}$ to make sure resonant current of L1 and C1 does not reverse during the cut-off time of first switching component Q2. As a result, during dead time of Q2 and Q3, resonant current discharges parasitic capacitor of Q2 to achieve ZVS.

Figure 14:
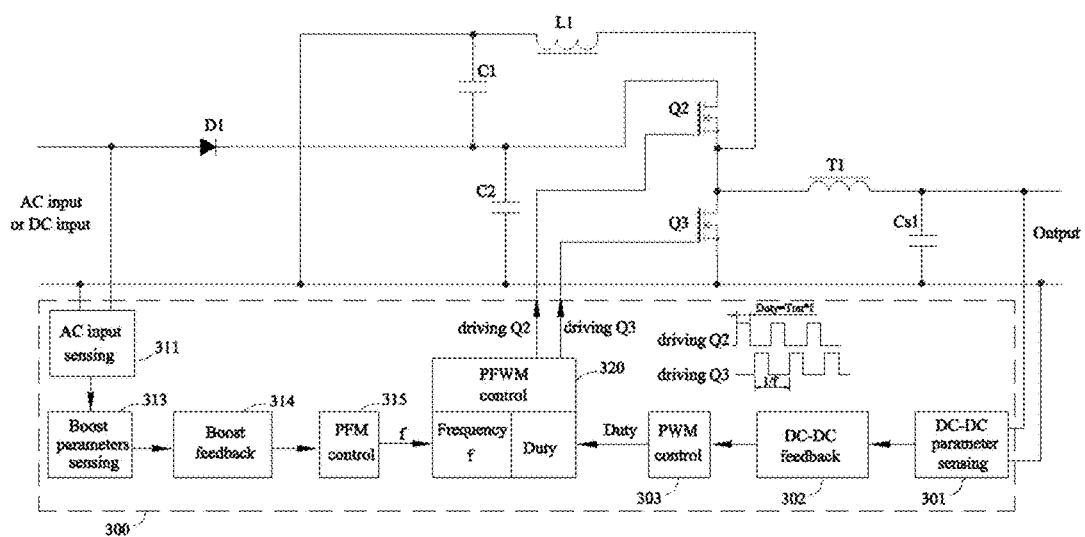
FIG. 14 shows the first embodiment of the PFWM control for the combination power supply of boost and BUCK converters.

First embodiment as shown in FIG. 14 provides a PFWM method used to control combination power supply of boost and BUCK converters.

The PFWM feedback control and driving unit 300 operates according to following processes: sense boost converter parameters such as input RMS voltage, i.e. AC input sensing 311 and other boost parameters, i.e. boost parameters sensing 313, feedback the sensed parameters through boost feedback 314 and conduct PFM control by PFM control unit 315, to calculate the frequency f of PFM chopping signal. Continuously or discontinuously adjust the frequency f to drive first switching component Q2 so as to control the output power of boost converter. The logic mechanism of PFM control unit 315 is: at low input AC voltage, reduce frequency to increase power of boost conversion; at high input voltage, increase frequency to reduce volt-second of boost inductor, which is favorable for smaller inductor design. The PFM control unit 315 could be realized by either hardware or software. BUCK DC-DC converter is controlled by PWM. The corresponding processes include: sense DC-DC converter output parameter like voltage or current or power, i.e. DC-DC parameter sensing 301, feedback the sensed parameter through DC-DC feedback 302, compare the parameter to setting value and according to automatic control theory to obtain the duty of PWM chopping signal by PWM control unit 303. BUCK DC-DC converter's output is stabilized by adjustment of the obtained duty. Combine the obtained frequency f of PFM and duty of PWM to form at least a pair of complementary PFWM driving signals 320. The PFWM driving signals are directly used or after modification to drive switching components Q2, Q3.

Above combination power supply of boost and BUCK converters comprises the below two parts:

First part: Two input rectification circuits.

1) First input rectification circuit includes first input rectification component, i.e. bridge diode D1, which rectifies input voltage in full wave mode, and stores energy in storage capacitor C2. When boost circuit operates after power supply's turn-on, boost output voltage on C2 is always higher than instant voltage of AC input, thus AC input no longer charges C2 directly. When boost output power is insufficient to maintain the voltage on C2 to be higher than instant AC voltage, AC input starts to charge C2 again.

2) Second input rectification circuit includes the first input rectification component D1 and other input rectification components D3, D4. The rectification circuit charges boost capacitor C1. Due to relatively small capacitance of C1, voltage on C1 reflects full wave rectification waveform of input AC. In active PFC (boost) circuit, boost capacitor C1 is provided for the purpose of high frequency noise reduction and improvement of EMI.

Second part: The combination of boost converter and BUCK DC-DC converter.

BUCK circuit includes storage capacitor C2, first switching component Q2, second switching component Q3, main inductor T1 and filter Cs1. The BUCK circuit works with feedback control and driving unit 300 to construct a BUCK DC-DC converter. On the other side, first switching component Q2, boost inductor L1, boost capacitor C1, second switching component Q3 and storage capacitor C2 form a boost converter.

Operating principle is described as below:

State 1: switching component Q2 turns on, Q3 turns off.

When Q2 conducts, energy in storage capacitor C2 flows in main inductor T1, to deliver power energy to load through filter Cs1.

Simultaneously, energy on C1, through switching component Q2, flows into first boost inductor L1, and boost energy is stored in boost inductor L1.

State 2: switching component Q2 turns off, Q3 keeps turn-off.

Energy stored in inductor T1, through output diode Ds1, output filter Cs1 and body diode of second switching component Q3, releases to output load. Energy stored in boost inductor L1, right at the time of Q2's cut-off, generates induced voltage and accumulates with voltage on C1, through body diode of second switching component Q3, to charge storage capacitor C2.

State 3: switching component Q2 keeps turn-off, Q3 turns on.

As second switching component Q3 turns on, both BUCK current and boost current go through Q3 instead of its body diode.

State 4: switching component Q2 keeps turn-off, Q3 turns off.

As second switching component Q3 turns off, both BUCK current and boost current go through Q3's body diode if they still exist.

Thus, both BUCK converter and boost converter complete one cycle of energy transferring.

Above process from state 1 to state 4 is repeated.

In the first embodiment, the PFWM control method is only suitable for the case when boost output voltage is more than 2 times of peak input voltage, so that the boost inductor can be safely reset.

Figure 15:
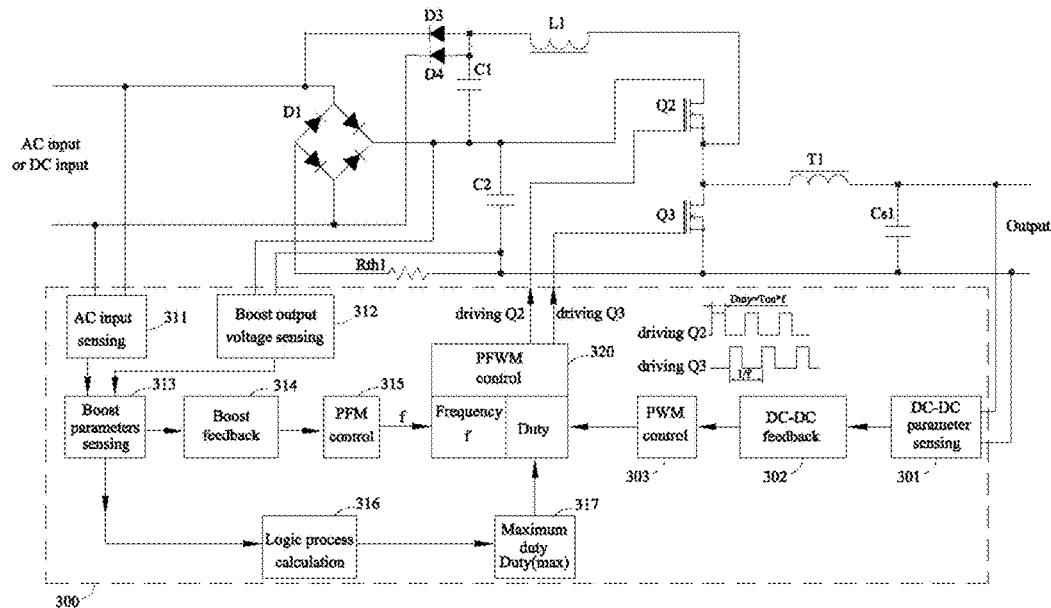
FIG. 15 shows the second embodiment of the PFWM control for the combination power supply of boost and BUCK converters.

Second embodiment as shown in FIG. 15 provides a PFWM method used to control combination power supply of boost and BUCK converter. Its difference to the first embodiment is: additionally, input instant voltage 311 and boost output voltage 312 are monitored. By logical process and calculation 316, Maximum duty 317 to prevent saturation of boost inductor L1 is calculated, and the calculated Maximum duty is used to limit PFWM control unit 320's operating duty.

Figure 16:
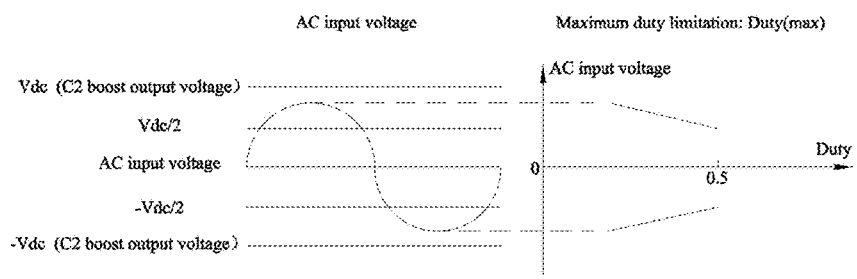
FIG. 16 is a diagram showing Duty(max) according to instant input voltage and Vdc.

Example of maximum duty related to AC input voltage (Vin) and boost output voltage (Vdc) is illustrated in FIG. 16. When Vin is higher than Vdc/2, maximum duty limit is applied.

Figure 17:
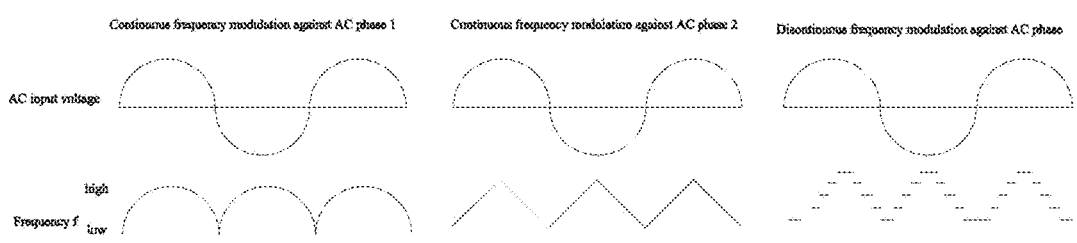
FIG. 17 is a diagram showing open loop control by adjusting operating frequency according to instant input voltage.

The open loop control for frequency modulation to the boost converter could be in the manner of continuous control or segmented control as shown in FIG. 17. Or a closed loop control can be used to adjust boost output voltage more precisely. The second embodiment is suitable for wide input voltage range of combination power supply of boost and BUCK converters.

Figure 18:
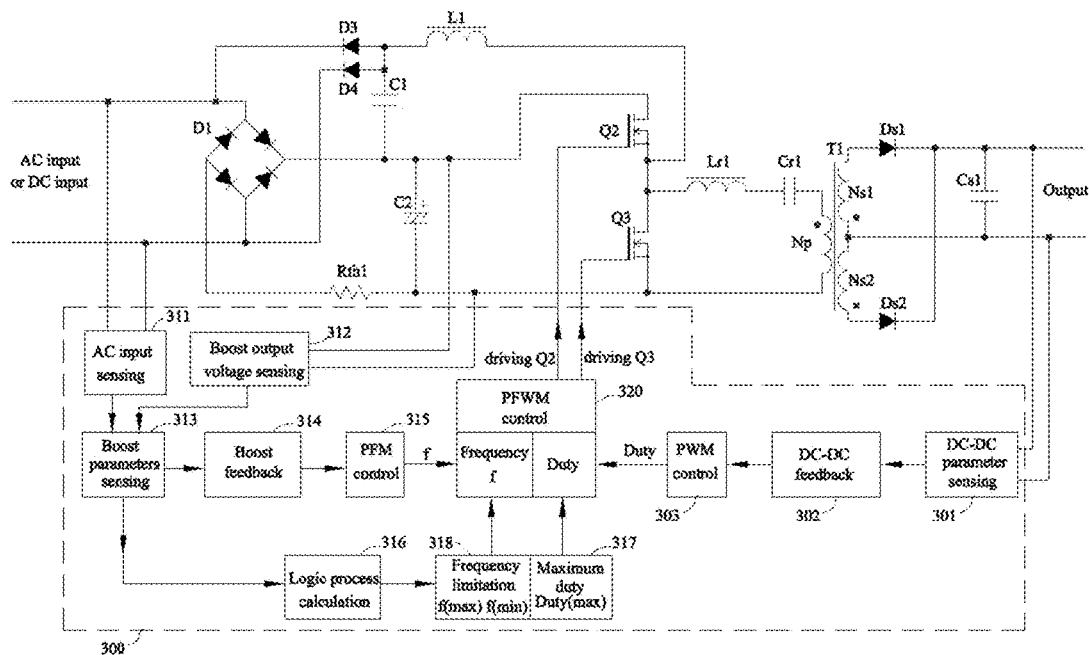
FIG. 18 shows the third embodiment of the PFWM control for the combination power supply of boost and half bridge converters.

Third embodiment as shown in FIG. 18 also utilizes PFWM method to control both boost and asymmetrical half bridge converters. Its difference to the second embodiment is: to use logic process calculation unit 316 to obtain maximum operating frequency $f_{(max)}$ and minimum operating frequency $f_{(min)}$ 318 based on boost parameters sensing 313 like input voltage 311 and boost output voltage 312. Use $f_{(max)}$ and $f_{(min)}$ in combination with Duty (max) to limit PFWM control unit 320, so as to ensure DCM of boost inductor L1 and proper ZVS operation of first switching component Q2 and second switching component Q3.

Figure 19:
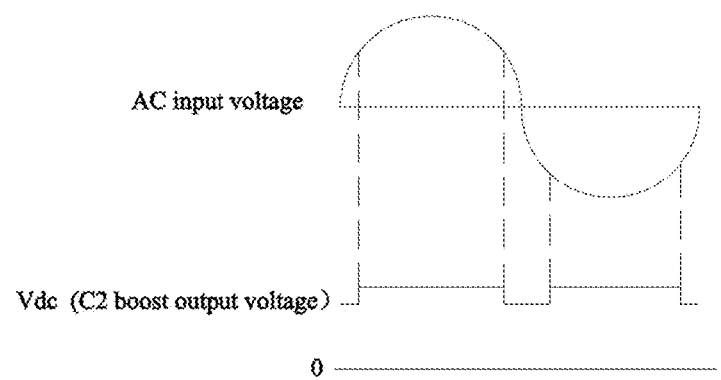
FIG. 19 is a diagram showing dynamic adjustment of boost output voltage in the third embodiment.

In order to improve insufficient boost power conversion during Duty(max) limitation, boost output voltage Vdc could be adjusted dynamically as shown in FIG. 19. According to equation Duty(max)=(Vdc−Vin)/Vdc, the increase of Vdc can result in the increase of Duty(max) synchronously, which alleviates the limit of operating duty. The increase of both Vdc and Duty(max) can increase capability of boost output power.

In summary, the PFWM control method according to the present invention is suitable for a combination power supply containing boost converter and bridge type converter, and is especially superior in control of a dual-rectification bridge type single stage PFC converter in which common switching components are shared between boost and DC-DC converters. Using a variable duty to control DC-DC output and using a variable frequency to further control boost output enables the power supply to achieve low cost, high efficiency, compact size, low noise features.

While the present invention has been shown and described in connection with the embodiments, it will be apparent to those skilled in the art that modifications and variations can be made without departing from the spirit and scopes of the invention as defined by appended claims.

What is claimed is:

1. A PFWM control method for a power supply, the power supply comprising a boost converter and a bridge type DC-DC converter, the bridge type DC-DC converter having a topology selected from the group consisting of BUCK, half bridge and full bridge, wherein the PFWM control method comprises simultaneously controlling the boost converter and the bridge type DC-DC converter;

wherein controlling of the bridge type DC-DC converter at least comprises controlling PWM of the bridge type DC-DC converter by sensing and feedbacking at least one output parameter among voltage, current and power of the bridge type DC-DC converter, comparing the output parameter to a first setting value, obtaining a duty of PWM chopping signal based on an automatic feedback control theory, and controlling output of the bridge type DC-DC converter at least by adjustment of the obtained duty;

wherein controlling of the boost converter at least comprises controlling PFM of the boost converter by sensing and feedbacking at least one boost converter parameter among input voltage, output voltage, current, power and phase, comparing the boost converter parameter to at least a second setting value or range, obtaining a frequency of PFM chopping signal based on a feedback control theory, and controlling output of the boost converter by continuous or discontinuous adjustment of the obtained frequency;

wherein the PFWM control method further comprises combining the obtained frequency of PFM chopping signal and duty of PWM chopping signal to form at least a pair of complementary PFWM driving signals, and driving switching components of the bridge type DC-DC converter and the boost converter by the PFWM driving signals with or without modification, so as to adjust output of the boost converter and output of the bridge type DC-DC converter.

2. The PFWM control method according to claim 1, further comprising monitoring an input instant voltage of the boost converter, and obtaining by a logic or mathematic calculation unit, a maximum duty to prevent saturation of a boost inductor in the boost converter caused by insufficient magnetic reset, the maximum duty limiting an operating duty of the PFWM driving signal.

3. The PFWM control method according to claim 1, further comprising dead time control between the complementary PFWM driving signals, to drive the switching components of the boost converter and the bridge type DC-DC converter.

4. The PFWM control method according to claim 1, further comprising sensing an instant input voltage or sensing an instant voltage after rectification, and setting a frequency of the PFWM driving signal based on the sensed value or range.

5. The PFWM control method according to claim 2, further comprising sensing an output voltage of the boost converter, and obtaining a maximum duty to prevent saturation of a boost inductor of the boost converter caused by insufficient magnetic reset, the maximum duty limiting an operating duty of the PFWM driving signal.

6. The PFWM control method according to claim 1, further comprising sensing an instant input voltage phase and setting a frequency of the PFWM driving signal according to the sensed phase.

7. The PFWM control method according to claim 1, further comprising sensing an instant input voltage or sensing an instant voltage after rectification, and dynamically setting an output voltage of the boost converter according to the sensed value or range.

8. The PFWM control method according to claim 1, further comprising detecting zero current of a boost inductor in the boost converter, and controlling a time interval between occurrence of the zero current of the boost inductor and a subsequent cut-off of the switching component of the bridge type DC-DC converter.

9. The PFWM control method according to claim 1, further comprising sensing an instant input voltage or sensing an instant voltage after rectification, and setting a maximum frequency of the PFWM driving signal according to the sensed value or range.

10. The PFWM control method according to claim 1, further comprising sensing an instant input voltage or sensing an instant voltage after rectification, and setting a minimum frequency of the PFWM driving signal according to the sensed value or range.

* * * * *